US008243600B2

(12) United States Patent
Zhu et al.

(10) Patent No.: US 8,243,600 B2
(45) Date of Patent: Aug. 14, 2012

(54) SYSTEM AND METHOD FOR ALLOCATING RESOURCES IN A NON-TRANSPARENT MULTI-HOP RELAY NETWORK

(75) Inventors: Chenxi Zhu, Gaithersburg, MD (US); Hui Zeng, Greenbelt, MD (US); Wei-Peng Chen, Santa Clara, CA (US)

(73) Assignee: Fujitsu Limited, Kawasaki (JP)

( * ) Notice: Subject to any disclaimer, the term of this patent is extended or adjusted under 35 U.S.C. 154(b) by 1022 days.

(21) Appl. No.: 12/199,660

(22) Filed: Aug. 27, 2008

(65) Prior Publication Data

US 2010/0054169 A1    Mar. 4, 2010

(51) Int. Cl.
*G01R 31/08* (2006.01)
(52) U.S. Cl. ........ 370/232; 370/330; 370/338; 370/341; 370/345; 370/395.4; 370/442; 455/464; 455/509
(58) Field of Classification Search .................. 370/232, 370/253, 328, 329, 330, 338, 341, 345, 395.4, 370/400, 401, 431, 442; 455/464, 509
See application file for complete search history.

(56) References Cited

U.S. PATENT DOCUMENTS

| 7,733,772 | B2 * | 6/2010 | Hazra et al. | 370/230 |
| 7,813,373 | B2 * | 10/2010 | Joshi et al. | 370/458 |
| 8,089,928 | B2 * | 1/2012 | Zhu et al. | 370/329 |
| 2006/0223524 | A1 * | 10/2006 | Ginzburg | 455/424 |
| 2007/0104223 | A1 * | 5/2007 | Lee et al. | 370/470 |
| 2010/0054170 | A1 * | 3/2010 | Zhu et al. | 370/315 |

OTHER PUBLICATIONS

DRAFT Standard for Local and Metropolitan Area Networks, Part 16: Air Interface for Broadband Wireless Access Systems, P802.16Rev2/DT Oct. 2008, © 2008 IEEE (2080 pages), Oct. 2008.
IEEE Standard for Local and Metropolitan Area Networks, Part 16: Air Interface for Fixed Broadband Wireless Access Systems, IEEE Std. 802.16™-2004 (Revision of IEEE Std. 802.16-2001 (857 pages), Oct. 1, 2004.
802.16.2™ IEEE Recommended Practice for Local and Metropolitan Area Networks, Coexistence of Fixed Broadband Wireless Access Systems, IEEE Std. 802.162™-2004 (Revision of IEEE Std. 802.16.2-2001 (171 pages), Mar. 17, 2004.

* cited by examiner

*Primary Examiner* — Christopher Grey
(74) *Attorney, Agent, or Firm* — Baker Botts L.L.P.

(57) ABSTRACT

A method for allocating resources in a wireless network includes establishing one or more links. The method also includes the following iterative steps: allocating a first number of slots to the relay links; dividing the first number of slots among the relay links; determining a representative relay data rate indicative of a data rate provided by one of the relay links for one of the multi-hop access links; allocating the second number of slots to the multi-hop access links; dividing the second number of slots among the multi-hop access links; determining the effective multi-hop data rate based on the minimum of the representative relay link data rate and the multi-hop data rate; allocating the third number of slots to the single-hop access links; dividing the third number of slots among the single-hop access links; and upon the single-hop data rate being approximately equal to the effective multi-hop data rate, provisioning the first, second and third number of slots.

24 Claims, 5 Drawing Sheets

SYSTEM AND METHOD FOR ALLOCATING RESOURCES IN A NON-TRANSPARENT MULTI-HOP RELAY NETWORK

TECHNICAL FIELD OF THE INVENTION

This invention relates in general to communication systems and, more particularly, to an apparatus and method for allocating resources in a non-transparent multi-hop relay network.

BACKGROUND OF THE INVENTION

While broadband network services and Voice over IP (VoIP) products continue to grow and expand, so does the demand for wireless network functionality. To help meet this demand, networks are being developed that use multiple base stations, relay stations, access points or other points of contact. In many scenarios the various base stations, relay stations, access points or other points of contact communicate with one another via wireless channels. One emerging wireless technology is IEEE 802.16, popularly known as WiMAX. WiMAX provides broadband wireless access, with a single base station providing coverage over a large area (theoretically up to 31 miles). The coverage area of a cell (the area controlled by a particular base station) may be enhanced through the use of relay stations. Other wireless networking technologies include Third Generation (3G), Third Generation Partnership Project (3GPP), and IEEE 802.11, popularly known as WiFi.

SUMMARY

In accordance with a particular embodiment, a method for allocating resources in a wireless network includes establishing one or more relay links, one or more single-hop access links, and one or more multi-hop access links. The method also includes iterative steps that are repeated until a first, second and third number of slots are provisioned. The iterative steps include allocating the first number of slots to the relay links and dividing them among the relay links. The iterative steps also include determining a representative relay data rate indicative of a data rate provided by one of the relay links for a respective one of the multi-hop access links. The representative relay data rate is based on the number of slots divided to the respective relay link and the number of multi-hop access links established with the respective relay station. The iterative steps further include allocating the second number of slots to the multi-hop access links and dividing them among the multi-hop access links ensuring that each multi-hop access link comprises an approximately equal multi-hop data rate. The iterative steps also include determining the effective multi-hop data rate based on the minimum of the representative relay link data rate and the multi-hop data rate. The iterative steps further include allocating the third number of slots to the single-hop access links and dividing the third number of slots among the single-hop access links ensuring that each single-hop access link comprises an approximately equal single-hop data rate. The iterative steps also include determining a minimum data rate based on the minimum of the single-hop data rate and the effective multi-hop data rate. Upon determining that the minimum data rate has reached its maximum value, the iterative steps additionally include provisioning the first number of slots to the relay links, the second number of slots to the multi-hop access links, and the third number of slots to the single-hop access links.

Technical advantages of particular embodiments may include a more efficient utilization of wireless resources in a multi-hop relay network. Accordingly, a multi-hop relay network may be able to accommodate a greater number of endpoints or provide the same number of endpoints with greater resources as compared to traditional multi-hop relay networks.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments and their advantages, reference is now made to the following description, taken in conjunction with the accompanying drawings, in which.

DETAILED DESCRIPTION

Figure 1:
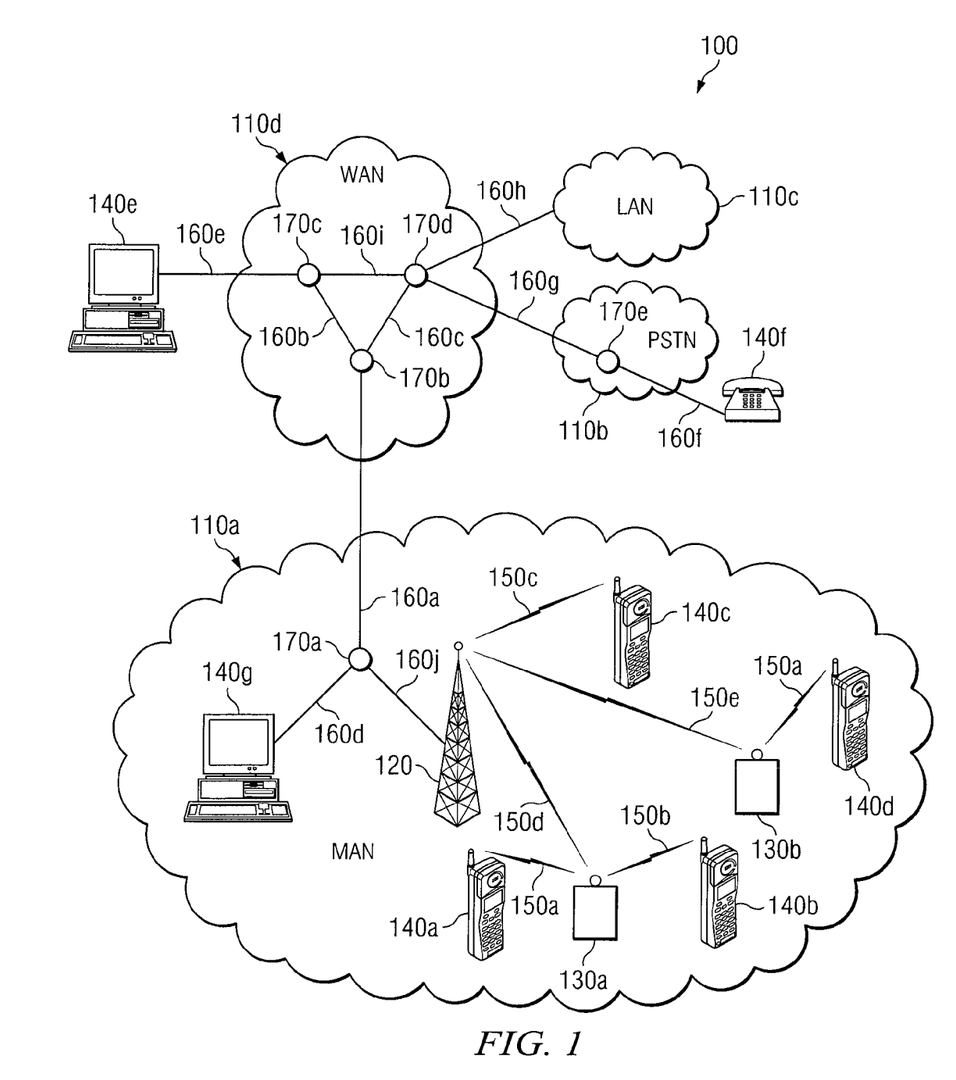
FIG. 1 illustrates a communication system comprising various communication networks, in accordance with a particular embodiment.

FIG. 1 illustrates a communication system comprising various communication networks, in accordance with a particular embodiment. Communication system 100 may be comprised of multiple networks 110. Each network 110 may be any of a variety of communication networks designed to facilitate one or more different services either independently or in conjunction with other networks. For example, networks 110 may facilitate internet access, online gaming, file sharing, peer-to-peer file sharing (P2P), voice over internet protocol (VoIP) calls, video over IP calls, or any other type of functionality typically provided by a network. Networks 110 may provide their respective services using any of a variety of protocols for either wired or wireless communication. For example, network 110a may comprise an 802.16 wireless network, popularly known as WiMAX, which may include base stations (e.g., base station 120) and relay stations (e.g., relay stations 130). Network 110a may provide for the use of relay stations 130 by implementing 802.16j. A WiMAX network that uses relay stations may be referred to as a mobile multi-hop relay (MMR) network.

In particular embodiments, one or more endpoints may have established a wireless connection with a relay station (access link). Accordingly, the relay station may need to ensure that there are sufficient wireless resources available for a wireless connection (relay link) between itself and a base station to maintain each of the wireless connections with the endpoints. For example, if endpoints 140a and 140b are both connected to relay station 130a then it may be desirable for wireless connection 150d to comprise sufficient resources to support both wireless connections 150a and 150b evenly (e.g., both endpoints 140a and 140b have the same data rate). This may be referred to as a rate fair setup (where all the endpoints serviced by a particular base station, either directly or indirectly, receive a similar data rate). While the endpoints may be receiving a similar data rate they may be consuming different quantities of wireless resources based on the efficiency and/or protocol that the endpoint uses. Thus, the wireless resources used by wireless connection 150*d* may correspond to the total amount of wireless resources used for endpoints 140*a* and 140*b*. This in turn impacts the amount of resources available to base station 120 for communicating with endpoints connected directly thereto (e.g., endpoint 140*c*). In some embodiments, the amount of wireless resources available to a particular component may be measured by the number of slots within a communication frame as discussed in more detail below. Particular embodiments may take into account the balance of wireless resources between relay links and access links when determining how wireless resources should be distributed.

Between each relay station and/or base station there may be a wireless connection, such as wireless connection 150*d*. As mentioned above, this wireless connection may be referred to as a relay link. A wireless connection may comprise various wireless resources such as, for example, a combination of a particular center frequency, a particular bandwidth, a particular time slot, and/or a particular subchannel (for example, as described in a downlink or uplink MAP). In particular embodiments, it may be convenient to discuss the amount of resources in terms of slots. Depending on the embodiment, a slot may comprise a particular number of subchannels and symbols (also known as time slots). For example, Section 8.4.3.1 in the Institute of Electrical & Electronics Engineers (IEEE) 802.16e-2005 Standard specifies a slot comprising a single subchannel and two symbols. An increase in the number of wireless connections 150 may increase the impact and severity of interference between wireless connections 150. In particular embodiments, uplink sounding may be used to estimate the channel gain and interference strength between multiple relay stations 130 and base station 150. The uplink sounding may, therefore, be used in determining the quality and/or efficiency of the various wireless connections.

Although communication system 100 includes four different types of networks, networks 110*a*-110*d*, the term "network" should be interpreted as generally defining any network or combination of networks capable of transmitting signals, data, and/or messages, including signals, data or messages transmitted through WebPages, e-mail, text chat, voice over IP (VoIP), and instant messaging. Depending on the scope, size and/or configuration of the network, any one of networks 110*a*-110*d* may be implemented as a LAN, WAN, MAN, PSTN, WiMAX network, global distributed network such as the Internet, Intranet, Extranet, or any other form of wireless or wired networking.

Generally, networks 110*a*, 110*c*, and 110*d* provide for the communication of packets, cells, frames, or other portions of information (generally referred to as packets herein) between endpoints 140 and/or nodes 170. Networks 110 may include any number and combination of wired links 160, wireless connections 150, nodes 170 and/or endpoints 140. For purposes of illustration and simplicity, network 110*a* is a MAN that may be implemented, at least in part, via WiMAX, network 110*b* is a PSTN, network 110*c* is a LAN, and network 110*d* is a WAN.

In particular embodiments, networks 110*a*, 110*c* and 110*d* may be IP networks. IP networks transmit data by placing the data in packets and sending each packet individually to the selected destination, along one or more communication paths. Network 110*b* may, for example, be a PSTN that may include switching stations, central offices, mobile telephone switching offices, pager switching offices, remote terminals, and other related telecommunications equipment that are located throughout the world. Network 110*d* may be coupled to network 110*b* through a gateway. Depending on the embodiment, the gateway may be a part of network 110*b* or 110*d* (e.g., nodes 170*e* or 170*c* may comprise a gateway). The gateway may allow PSTN 110*d* to be able to communicate with non-PSTN networks such as networks 110*a*, 110*c* and 110*d*.

Any of networks 110*a*, 110*c* or 110*d* may be coupled to other IP networks including, but not limited to, the Internet. Because IP networks share a common method of transmitting data, signals may be transmitted between devices located on different, but interconnected, IP networks. In addition to being coupled to other IP networks, any of networks 110*a*, 110*c* or 110*d* may also be coupled to non-IP networks through the use of interfaces or components such as gateways.

Networks 110 may be connected to each other and with other networks via a plurality of wired links 160, wireless connections 150, and nodes 170. Not only do the wired links 160, wireless connections 150, and nodes 170 connect various networks but they also interconnect endpoints 140 with one another and with any other components coupled to or a part of any of networks 110. The interconnection of networks 110*a*-110*d* may enable endpoints 140 to communicate data and control signaling between each other as well as allowing any intermediary components or devices to communicate data and control signals. Accordingly, users of endpoints 140, may be able to send and receive data and control signals between and among each network component coupled to one or more of networks 110*a*-110*d*.

As noted above, wireless connections 150 may represent a wireless link between two components using, for example, WiMAX. The extended range of a WIMAX base station and/or relay station may allow network 110*a* to cover the larger geographic area associated with a MAN while using a relatively small number of wired links. More specifically, by properly arranging base station 120 and multiple relay stations 130 around a metropolitan area, the multiple relay stations 130 may use wireless connections 150 to communicate with base station 120 and wireless endpoints 140 throughout the metropolitan area. Then base station 120 may, through wired connection 160*a*, communicate with other base stations, network components not capable of establishing a wireless connection, and/or other networks outside of the MAN, such as network 110*d* or the Internet.

Nodes 170 may include any combination of network components, session border controllers, gatekeepers, base stations, conference bridges, routers, hubs, switches, gateways, endpoints, or any other hardware, software, or embedded logic implementing any number of communication protocols that allow for the exchange of packets in communication system 100. For example, node 170*a* may comprise another base station that is wired to base station 120 via link 160*j* and to network 110*d* via link 160*a*. As a base station, node 170*a* may be able to establish several wireless connections with various other base stations, relay stations, and/or endpoints. As another example, node 170*e* may comprise a gateway. This may allow network 110*b*, a PSTN network, to be able to transmit and receive communications from other non-PSTN networks, such as network 110*d*, an IP network. Node 170*e*, as a gateway, works to translate communications between the various protocols used by different networks.

Endpoints 140 and/or nodes 170 may provide data or network services to a user through any combination of hardware, software embedded in a computer readable medium, and/or encoded logic incorporated in hardware or otherwise stored (e.g., firmware). For example, endpoints 140a-140d may include an IP telephone, a computer, a video monitor, a camera, a personal data assistant, a cell phone or any other hardware, software and/or encoded logic that supports the communication of packets (or frames) using networks 110. Endpoints 140 may also include unattended or automated systems, gateways, other intermediate components or other devices that can send or receive data and/or signals. Although FIG. 1 illustrates a particular number and configuration of endpoints, connections, links, and nodes, communication system 100 contemplates any number or arrangement of such components for communicating data. In addition, elements of communication system 100 may include components centrally located (local) with respect to one another or distributed throughout communication system 100.

Figure 2:
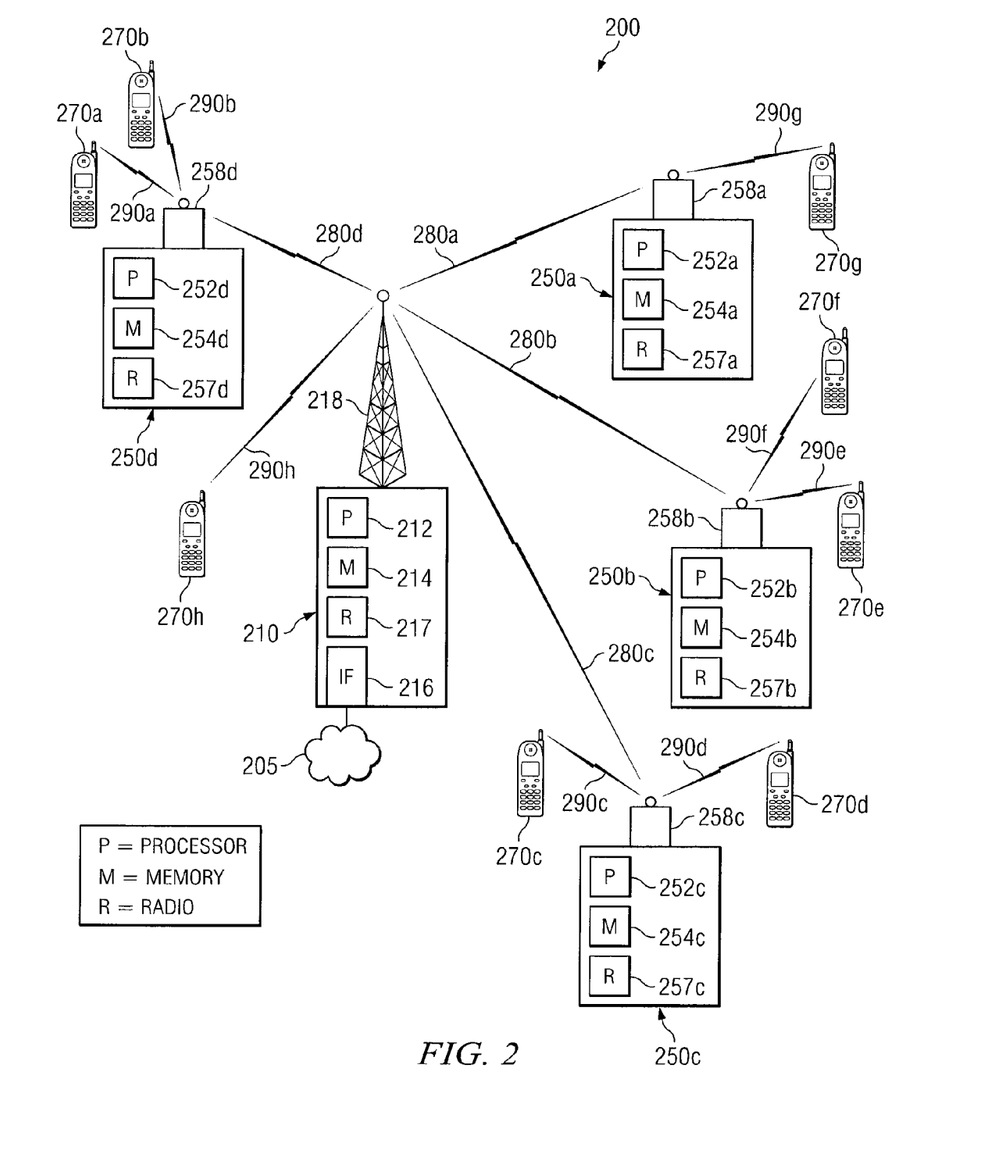
FIG. 2 illustrates a wireless network comprising a more detailed view of a base station and several relay stations, in accordance with a particular embodiment.

FIG. 2 illustrates a wireless network comprising a more detailed view of base station 210 and relay stations 250, in accordance with a particular embodiment. In different embodiments the network may comprise any number of wired or wireless networks, base stations, endpoints, relay stations, and/or any other components that may facilitate or participate in the communication of data and/or signals whether via wired or wireless connections. For simplicity, wireless network 200 of the depicted embodiment comprises wired network 205, base station 210, endpoints 270 and relay stations 250. Base station 210 comprises processor 212, memory 214, interface 216, radio 217 and antenna 218. Similarly, relay stations 250 comprise processors 252, memory modules 254, radios 257 and antennas 258. These components may work together in order to provide base station and/or relay station functionality, such as providing wireless connections in a wireless network (e.g., a WiMAX wireless network). Network 205 may comprise one or more of the networks described above with respect to FIG. 1. For example, network 205 may comprise the Internet, a LAN, WAN, MAN, PSTN or some combination of the above.

Processor 212 may be a microprocessor, controller, or any other suitable computing device, resource, or combination of hardware, software and/or encoded logic operable to provide, either alone or in conjunction with other base station 210 components, such as memory 214, base station 210 functionality. Such functionality may include providing various wireless features discussed herein to an endpoint or relay station, such as endpoint 270h or relay station 250a. For example, processor 212 may determine how to distribute wireless resources among the access links and relay links used by endpoints 270 and relay stations 250. The distribution of wireless resources may be such that a rate fair scheme may be implemented. In determining the distribution of wireless resources, processor 212 may take into account the number of relay links and access links that are needed as well as the efficiency with which those links are able to transmit/receive data. Furthermore, as the number and type of endpoints change, processor 212 may be able to adjust the allocation of wireless resources on a frame-by-frame basis.

Memory 214 may be any form of volatile or non-volatile memory including, without limitation, magnetic media, optical media, random access memory (RAM), read-only memory (ROM), flash memory, removable media, or any other suitable local or remote memory component or components. Memory 214 may store any suitable data or information utilized by base station 210, including software embedded in a computer readable medium, and/or encoded logic incorporated in hardware or otherwise stored (e.g., firmware). In some embodiments memory 214 may store information used by processor 212 in determining how to divide wireless resources between access links and relay links. Memory 214 may also store the results and/or intermediate results of the various calculations and determinations performed by processor 212. Memory 214 may also store information regarding the quality of particular links. This quality may be an indication of how efficient a particular link is at transferring data. Memory 214 may also maintain a list, database, or other organization of data useful for determining how to route data to the proper endpoints and/or relay stations. For example, in some embodiments a tree structure (as opposed to a mesh structure) may be used in routing data from an endpoint to a base station. More specifically, there may be a known path from base station 210 to endpoint 270b. This path, or a portion thereof, may be stored in memory 214.

Base station 210 also comprises interface 216 which may be used for the wired communication of signaling and/or data between base station 210 and network 205. For example, interface 216 may perform any formatting or translating that may be needed to allow base station 210 to send and receive data from network 205 over a wired connection. Interface 216 may also be used to establish any wired connections between base station 210 and other networks or network components.

Radio 217 may be coupled to or a part of antenna 218. Radio 217 may receive digital data that is to be sent out to other base stations, relay stations and/or endpoints via a wireless connection. The wireless connection may use the wireless resources assigned to base station 210. The wireless resource may include, for example, a combination of one or more of a center frequency, bandwidth, time slot, channel, and/or subchannel. In particular embodiments this information may be stored in memory module 214. Radio 217 may convert the digital data into a radio signal having the appropriate center frequency and bandwidth parameters. These parameters may have been determined ahead of time by some combination of processor 212 and memory 214. The radio signal may then be transmitted via antenna 218 for receipt by any appropriate component or device (e.g., relay station 250d). Similarly, radio 217 may convert radio signals received from antenna 218 into digital data to be processed by processor 212.

Antenna 218 may be any type of antenna capable of transmitting and receiving data and/or signals wirelessly. In some embodiments, antenna 218 may comprise one or more omni-directional, sector or panel antennas operable to transmit/receive radio signals between 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. Together, radio 217 and antenna 218 may form a wireless interface. This wireless interface may be used to establish connections with various wireless components, including endpoints and relay stations.

Relay stations 250 may, in essence, be smart repeaters between base station 210 and endpoints 270. Depending on the embodiment and configuration of a relay station, one or more of relay stations 250 may be transparent or non-transparent. From the perspective of an endpoint, a transparent relay station is perceived as though the endpoint were communicating with base station 210 while a non-transparent relay station is perceived as though it were another base station. More specifically, a transparent relay station may not transmit related control information (e.g. a preamble or downlink/uplink MAP) whereas a non-transparent relay station may transmit this information.

Relay stations 250 may comprise components similar to those of base station 210. One exception for relay stations 250 is that relay stations 250 may not include an interface for a wired connection. This may be because relay stations 250 may communicate with base station 210 and other relay stations 250 via wireless connections. Thus, relay stations 250 may not need a wired connection. By allowing relay stations 250 to be deployed without a wired connection, the initial deployment cost may be lower because network wires do not have to be run out to each relay station 250. In particular embodiments, a relay station may include an interface for a wired connection. Relay stations 250a, 250b, 250c, and 250d may comprise similar components that may provide similar functionality. Therefore, for simplicity, the following discussion of the relay station components depicted in FIG. 2 may refer to the component in general and may be applied to each relay station.

Like base station 210, relay station 250 comprises a processor. Processor 252 may be a microprocessor, controller, or any other suitable computing device, resource, or combination of hardware, software and/or encoded logic operable to provide, either alone or in combination with other relay station 250 components, such as memory module 254, relay station 250 functionality. Such functionality may include providing various wireless features discussed herein to an endpoint or base station, such as endpoints 270a-270b or base station 210. In particular embodiments, processor 252 may determine the quality of one or more wireless connections or links. This information may be provided to base station 218.

Like memory 214, memory module 254 may be any form of volatile or non-volatile memory including, without limitation, magnetic media, optical media, random access memory (RAM), read-only memory (ROM), flash memory, removable media, or any other suitable local or remote memory component or components. Memory module 254 may store any suitable data or information, including software embedded in a computer readable medium, and/or encoded logic incorporated in hardware or otherwise stored (e.g., firmware) utilized by relay station 250. In some embodiments, memory module 254 may store information indicative of the size, features and number of slots that may be needed or used for each wireless connection. Memory module 254 may additionally maintain a list, database, or other organization of data useful for determining how to route data to the proper endpoints, base stations and/or relay stations.

Radio 257 may be coupled to or a part of antenna 258. Radio 257 may receive digital data from, for example, processor 252 that is to be sent out to other base stations, relay stations and/or endpoints via a wireless connection. The wireless connection may use the wireless resources assigned to relay station 250. The wireless resource may include, for example, a combination of one or more of a center frequency, bandwidth, time slot, channel, and/or subchannel. In particular embodiments this information may be stored in memory module 254. Radio 257 may convert the digital data into a radio signal having the appropriate center frequency and bandwidth parameters. These parameters may have been determined ahead of time by base station 210 or processor 252. The radio signal from radio 257 may then be transmitted via antenna 258 to the appropriate recipient (e.g., base station 210) at the appropriate time. Radio 257 may also convert radio signals received by antenna 258 into digital data to be processed by processor 252.

Antenna 258 may be any type of antenna capable of transmitting and receiving data and/or signals wirelessly. In some embodiments, antenna 258 may comprise one or more omnidirectional, sector or panel antennas operable to transmit/receive radio signals between 2 GHz and 66 GHz. Antenna 258 and radio 257 may collectively be referred to as a wireless interface, or simply an interface. This wireless interface may be used to establish connections with various wireless components, including endpoints and base stations.

Endpoints 270 may be any type of wireless endpoints able to send and receive data and/or signals to and from base station 210 or relay stations 250. Some possible types of endpoints 270 may include desktop computers, PDAs, cell phones, laptops, and/or VoIP phones.

In particular embodiments, wireless network 200 may be provisioned so that each endpoint 270 receives the same data rate. This may be referred to as rate fair. While each endpoint 270 may receive approximately the same data rate, the amount of resources that may be used may vary. For example, a particular endpoint that is using a less efficient wireless communication protocol or is in an area with poor signal strength may consume more wireless resources to achieve the same data rate as a more efficient endpoint. Furthermore, as may be apparent, in order to maintain the data rates for the access links (e.g., between endpoints 270a and 270b and relay station 250d), the relay link (e.g., between relay station 250d and base station 210) needs to support matching data rates. The more wireless resources (e.g., slots) used by base station 210 for relay links, the fewer wireless resources it will have available for its own access links (e.g., between endpoint 270h and base station 210).

Processor 212, for example, may take these competing factors into account when determining the data rate for endpoints 270 and how to allocate wireless resources. This may best be seen by the following example in which relay stations 250 are non-transparent relays stations. In this example it may be assumed that data is communicated using frames as depicted in FIGS. 3A-3B and discussed below.

Figure 3A:
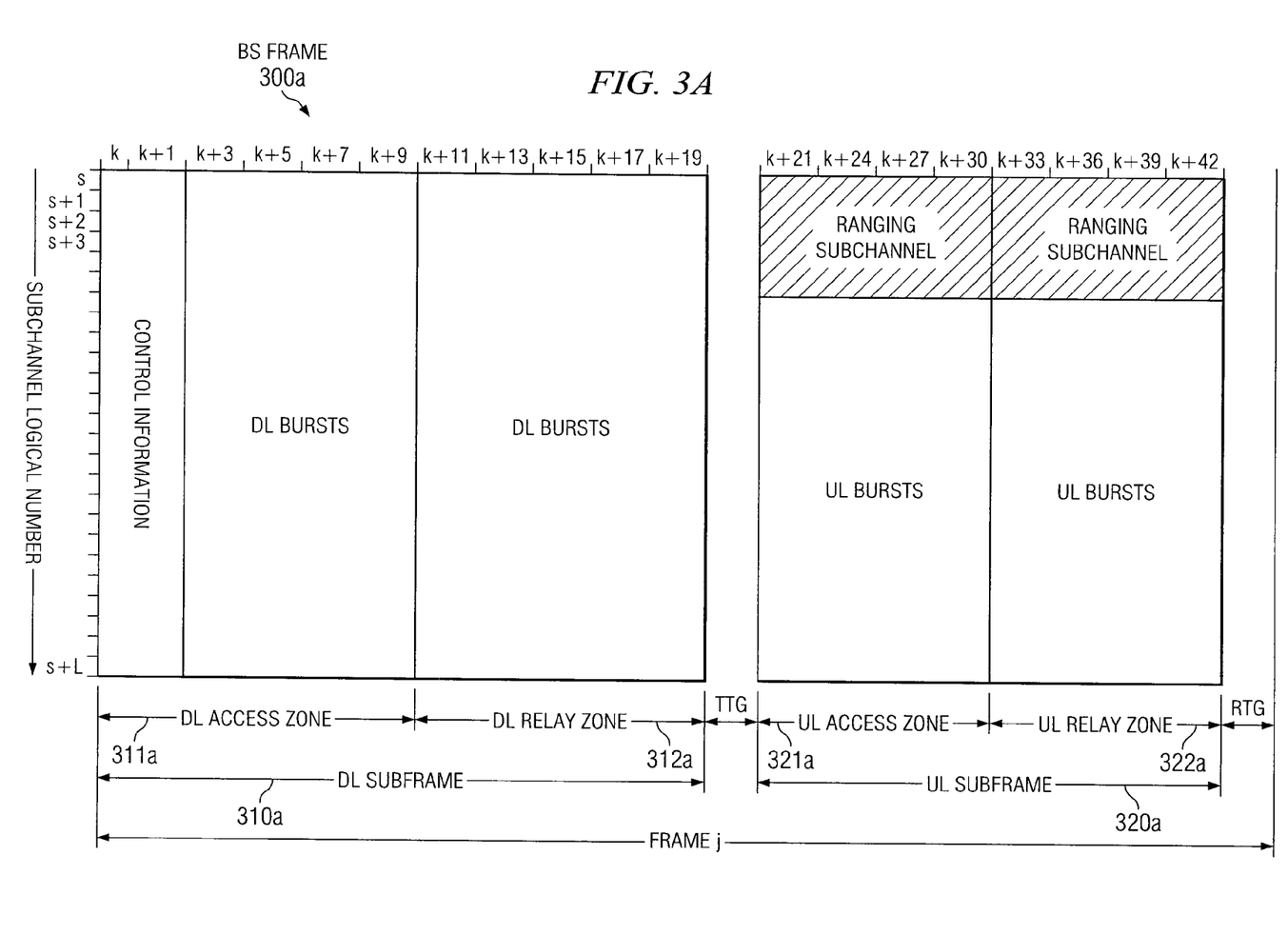
FIGS. 3A and 3B illustrate block diagrams of the frame structure of a base station frame and a relay station frame, respectively, for use with a non-transparent relay station, in accordance with particular embodiments.
Figure 3B:
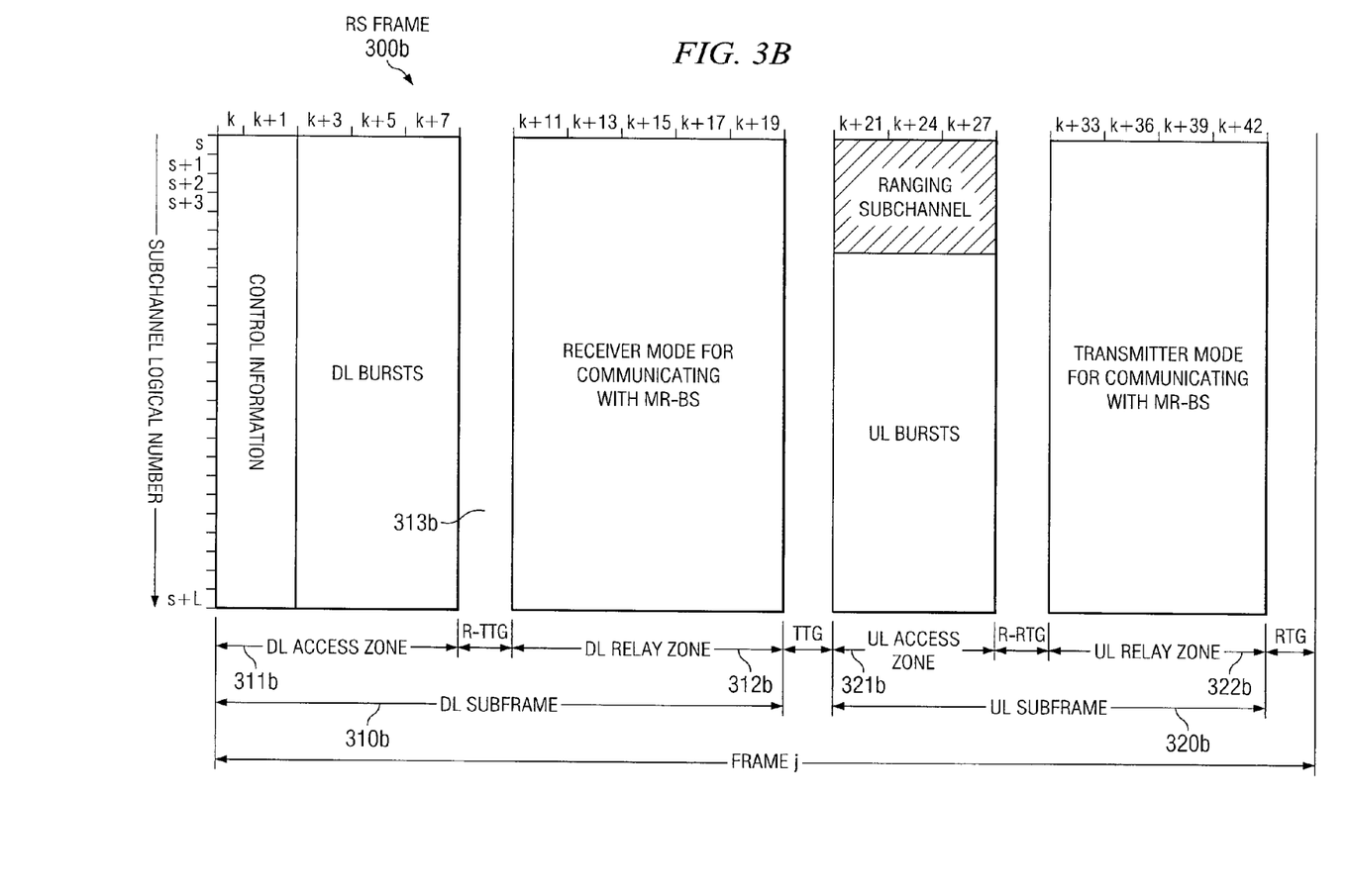

FIGS. 3A and 3B illustrate block diagrams of the frame structure of a base station frame and a relay station frame, respectively, for use with a non-transparent relay station, in accordance with particular embodiments. Frames 300 comprise a fixed number of slots (a slot may comprise a specific time, duration and channel/subchannel). The actual number of slots may depend on the size of a slot and the size of frame 300 specified by the protocol used by network 200. In particular embodiments, frames 300 may comprise four-hundred fifty slots. Frames 300 may be broken down into two different sub-frames, downlink sub-frame 310 and uplink sub-frame 320. The sub-frames may further be broken down into different zones. Downlink sub-frame 310 may comprise a downlink access zone 311 and a downlink relay zone 312. In addition, frame 300b may also include transition 313b which may provide time for the relay station to transition from transmitting to receiving. Uplink sub-frame 320 may comprise uplink access zone 321 and uplink relay zone 322. The size of these zones may be based on the number of slots used by a particular set of links. For example, the size of relay zone 312 may be based on the number of slots assigned to relay links 280 of FIG. 2. Thus while a frame may be of a fixed size (e.g., duration and channel), the zones within a frame may vary based on the number of slots assigned to, for example, the relay links between a base station and any relay stations.

Within downlink sub-frame 310, downlink access zone 311a may be used by a base station (e.g., base station 210) to transmit data to any endpoints (e.g., endpoint 270h) connected thereto. Similarly, downlink access zone 311b may be used by the relay stations (e.g., relay stations 250) to transmit data to any of the endpoints (e.g., endpoints 270a-270g) connected thereto. Because the relay stations are non-transparent they may be able to transmit data to their endpoints at the same time that the base station is transmitting data to its endpoints. In particular embodiments, both downlink access zones 311 may include control information, such as a preamble, and downlink and uplink MAPs. Downlink relay zone 312a may be used by the base station to transmit data to the relay stations connected thereto. Accordingly, the relay stations may use downlink relay zone 312b to receive data from the base station.

Within uplink sub-frame 320, uplink access zone 321a may be used by the base station to receive data from any endpoints connected thereto. Similarly, the relay stations may use uplink access zone 321b to receive data from any of the endpoints connected thereto. Uplink relay zone 322a may then be used by the base station to receive data from any relay stations connected thereto. Accordingly uplink relay zone 322b may be used by the relay stations to transmit data to the base station.

Returning to FIG. 2, it may be assumed, for purposes of this example, that wireless network 200 includes non-transparent relay stations 250. In order to determine the data rate each endpoint 270 is to receive, and thus what size each zone of the frame needs to be, processor 212 may first need to receive certain information. This information may include the number of relay stations and endpoints that are connected, both directly and indirectly (e.g., through one of relay stations 250) to base station 210 as well as the quality of each link between each component. All, some, or none of this information may automatically be provided to base station 210 as part of the wireless protocol used by wireless network 200. The link quality information may be used to determine the efficiency with which data is communicated over a particular link. In some embodiments processor 252c of relay station 250c, for example, may aggregate and/or average the link quality of all its access links (e.g., the links used by endpoints 270c and 270d). Base station 210 may receive this information via antennae 218 and radio 217 and store it in memory 214.

Processor 212 may then tentatively allocate a certain number of slots to be used for relay links 280. Using the link quality information associated with the respective relay links, stored in memory 214, and the number of endpoints connected to each relay station. More specifically, the number of slots assigned to a particular relay station may be proportional to the number of endpoints connected thereto and inversely proportional to the link quality of its relay link. Then slots may be divided among access links 290a-290g for endpoints 270a-270g connected to relay stations 250 such that each of endpoints 270a-270g receive an approximately equal data rate. Depending on the number of slots assigned to the relay link and access link, and their respective link quality, the respective relay link and access link may provide an endpoint with different data rates. Accordingly, the effective data rate for a particular endpoint, (e.g., endpoint 270b), is the minimum of the data rate provided by its access link (e.g., access link 290b) and its respective portion of its relay link (e.g., relay link 280d). In particular embodiments, the number of slots processor 212 may assign to endpoints connected directly to base station 210 may be based on the number of slots that have been assigned to the relay links. More specifically, processor 212 may subtract the number of slots used in downlink relay zone 312 and uplink relay zone 322 from the total number of slots available for frame 300. In other words as the size of relay zones 312 and 322 increases the size of access zones 311 and 320 decreases.

Processor 212 then has enough information to determine whether all the access links 290 are providing their respective endpoints 270 with a similar data rate. More specifically, processor 212 may be able to compare the data rate of endpoint 270h with the effective data rate for any of endpoints 270a-270g. If the data rates are not similar, processor 212 may adjust the number of slots that were previously assigned for use by relay links 280 and repeat the above described determinations. For example, in particular embodiments processor 212 may increase or decrease the number of slots that were tentatively assigned to be used for relay links 280 in 5 slot increments. Then it may repeat the above determinations and calculations so as to compare the resulting data rate of access links 290. This may be repeated until processor 212 has determined that each endpoint 270 will receive a similar data rate.

In particular embodiments, one or more of relay stations 250 may communicate with base station 210 via another relay station 250. In other words, it may be that two or more relay stations are cascaded such that a communication from an endpoint connected to a relay station at the end of the cascade may pass through, and be relayed by, another relay station before it reaches base station 210. Besides relaying communication from another relay station, the intermediary relay station may also have endpoints connected thereto. Thus, as may be apparent, the relay link for the intermediary relay station may need sufficient bandwidth to cover the endpoint connected thereto, as well as the endpoints connected to the relay station at the end of the cascade. An arrangement of cascaded relay stations may easily be envisioned if it were assumed that relay link 280b went from relay station 250b to relay station 250c (instead of to base station 210). Particular embodiments may account for the cascading relay stations by each of the relay stations (beginning with the relay station furthest from the base station) adjusting the zone size assigned to itself and the frame size assigned to its children relay stations from next hop to the end of the cascade so that every endpoint connected to any of these relay stations gets equal throughput on the relay link.

Figure 4:
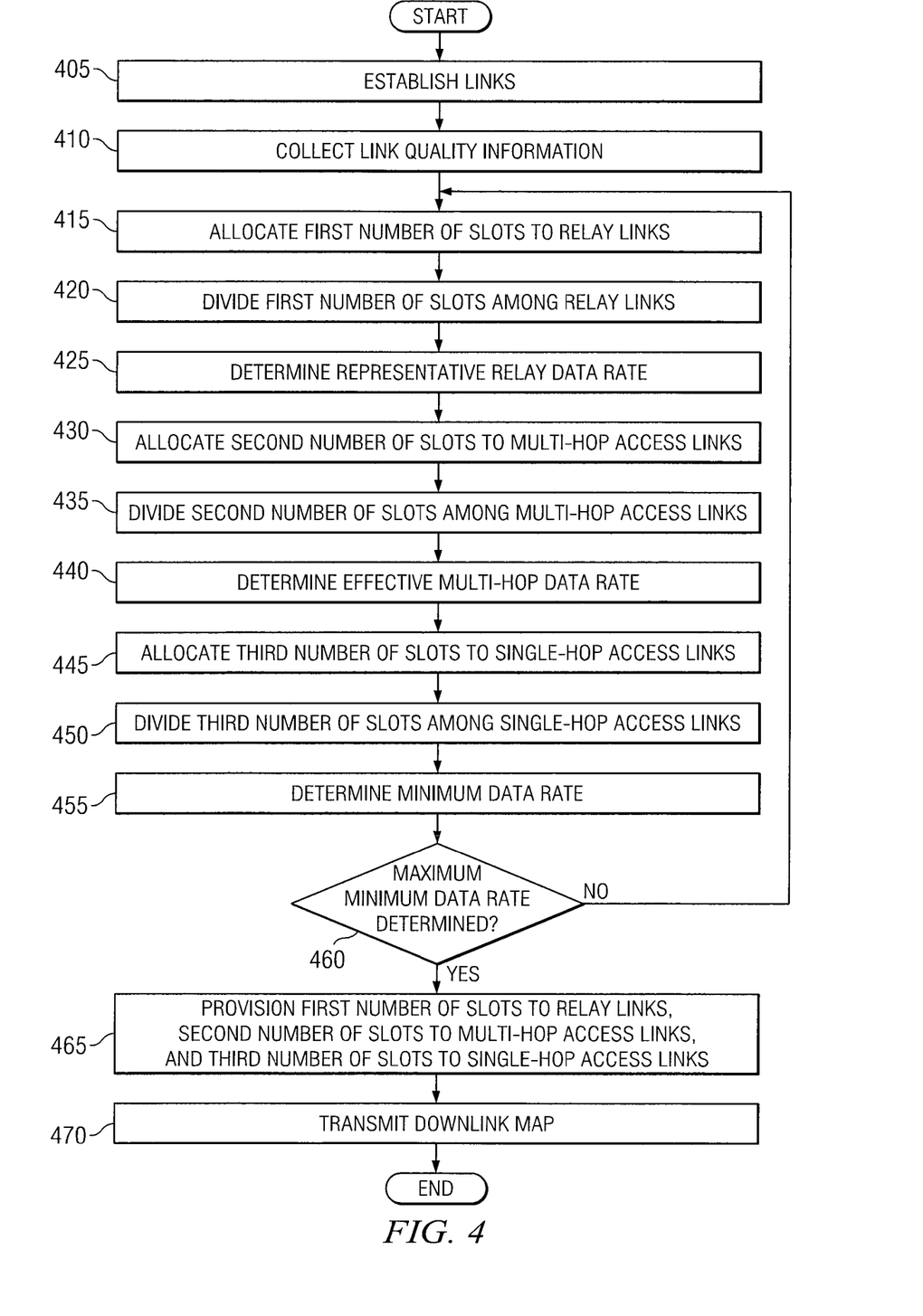
FIG. 4 illustrates a method for allocating resources in a non-transparent multi-hop relay network, in accordance with particular embodiments.

FIG. 4 illustrates a method for allocating resources in a non-transparent multi-hop relay network, in accordance with particular embodiments. The method begins at step 405 with the establishment of links. This may include establishing one or more relay links between the base station and one or more relay stations, one or more single-hop access links between the base station and one or more endpoints, and one or more multi-hop access links between the relay stations and one or more endpoints (different than the endpoints linked to the base station). For convenience, the endpoints linked to the base station may be referred to as single-hop endpoints and the endpoints linked to the relay stations may be referred to as multi-hop endpoints.

At step 410 link quality information is collected. The link quality information may be collected for any of the single-hop access links, multi-hop access links and/or relay links. The link quality information received at step 410 may be indicative of the efficiency with which a link may be able to communicate data. This efficiency may be affected by such factors as the distance between the endpoint and the relay station or base station, the signal strength, and/or the protocol being used. In some embodiments, the link quality of a particular set of links, such as a set of multi-hop access links between a set of endpoints and a relay station, may be aggregated, averaged, or otherwise summarized. The link quality information may be determined during establishment of the links (step 405), on a periodic basis, or after a certain number of frames. Thus, the base station may maintain a relatively current record of the link quality for various access links and relay links.

At step 415 a first number of slots are allocated to the relay links. The first number of slots assigned to the relay links may be based on the number of slots that were previously assigned.

More specifically, in instances where step 415 is being executed for the first time for a particular frame, the first number of slots may be based on the number of slots that were assigned to the relay links in a previous frame. In instances where step 415 is being executed for the second time for the same frame, the first number of slots may be based on the number of slots that were initially assigned at step 415 during a previous iteration along with information related to the disparity between the single-hop data rate and the effective multi-hop data rate. In some scenarios, such as the very first time step 415 is executed, the assignment of the first number of slots may be predetermined.

At step 420, the first number of slots are divided among the relay links. The first number of slots may be divided so as to take into account current operating conditions. More specifically, the number of slots assigned to a particular relay station may be proportional to the number of endpoints connected thereto and inversely proportional to the link quality of its relay link. Thus, the first number of slots may be divided so that those relay stations needing more resources will be assigned more slots. More specifically, because this method is attempting to implement a rate fair scheme, it may be assumed that all the endpoints are to receive the same data rate. Thus, as the number of endpoints increase, so does the data rate requirement of the relay link. Additionally, lower quality links, being less efficient in transferring data, may need additional slots to achieve the same data rate as more efficient links.

At step 425 a representative relay data rate is determined. The representative relay data rate is based on the data rate of the respective relay link and the number of multi-hop access links established with the respective relay station. In other words, the representative relay data rate is the data rate the relay link is able to provide to an individual multi-hop access link. In particular embodiments, the relay data rate may be based on the number of slots that were divided to the respective relay link at step 420 and the link quality of the relay link as collected at step 410.

At step 430, a second number of slots are allocated to the multi-hop access links. The second number of slots assigned to the multi-hop access link may be determined in part by the first number of slots that were assigned to the respective relay link. More specifically, the number of slots available for the multi-hop access links may be determined from the total number of slots that are available (within a downlink or uplink sub-frame) less the first number of slots that were assigned to the relay link (e.g., as depicted in FIG. 3B). In particular embodiments, the number of slots that are available for the multi-hop access links may vary between relay stations. The multi-hop access links serviced by a particular relay station may be a subset of the second number of access links serviced by a particular base station. More specifically, a base station may service multi-hop access links from multiple different relay stations.

At step 435 the second number of slots are divided among the multi-hop access links. By taking into account the respective link quality of each access link, it may be possible to ensure that each multi-hop endpoint is provided with an approximately equal data rate. In particular embodiments, each relay station may divide the slots among the endpoints connected thereto.

At step 440, the effective multi-hop data rate is determined. In some embodiments, the effective multi-hop data rate may be the lesser of the representative relay link data rate and the multi-hop data rate. As alluded to above, this may be because depending on the number of endpoints, either the representative relay link data rate or the multi-hop data rate may be the limiting data rate. More specifically, as the number of slots used for the relay link increases (thus increasing the representative relay data rate) the number of slots available for the multi-hop access links decreases (thus decreasing the multi-hop data rate).

At step 445, a third number of slots are allocated to the single-hop access links. As with the second number of slots that were assigned to the multi-hop access links, the third number of slots assigned to the single-hop access links may be based on the first number of slots that were assigned to the relay links and the total number of slots available (e.g., as depicted in FIG. 3A). More specifically, the third number of slots may be determined by reducing the total number of slots available within a particular downlink or uplink subframe by the first number of slots assigned to the relay links.

At step 450 the third number of slots are divided among the single-hop access links. By using the link quality information associated with each of the respective single-hop access links, it may be possible to ensure that each single-hop access link is able to provide its endpoint with an approximately equal single-hop data rate.

At step 455 the minimum data rate is determined by comparing the single-hop data rate with the effective multi-hop data rate. As may be apparent, increases in the effective multi-hop data rate could decrease the single-hop data rate. Particular embodiments strive to maximize this minimum data rate. In some situations it may be that minimum data rate is maximized when the effective multi-hop data rate is approximately equal to the single-hop data rate.

At decisional step 460 it is determined whether the minimum data rate has reached its maximum value. This may be determined using a variety of techniques. One such technique may involve initially allocating a relatively low number of slots to the relay links (thus providing a relatively low effective multi-hop data rate) at step 415. Then as the effective multi-hop data rate increases, so too may the minimum data rate. The minimum data rate of each iteration (or a predetermined number of the most recent iterations) may be stored and compared to the minimum data rate of a previous iteration. Once the minimum data rate of the current iteration is less than the minimum data rate of the previous iteration then the maximum value for the minimum data has been found (the minimum data rate of the previous iteration).

If the maximum value of the minimum data rate has not been determined then the method returns back to step 415 and a different first number of slots is assigned to the relay link. As discussed above, when the first number of slots are assigned to the relay link in this particular instance, the number of slots will be assigned based on the first number of slots that were assigned the first time step 415 was executed and how far apart the resulting individual single-hop data rate and individual multi-hop data rate differed. On the other hand, if the maximum value of the minimum data rate has been determined then the method continues to step 465 where the slots are provisioned to the respective links. More specifically, the first number of slots are provisioned for the relay links, the second number of slots are provisioned to the multi-hop access links, and the third number of slots are provisioned to the single hop access links.

Once the slots have been provisioned, a downlink MAP is transmitted at step 470. The downlink MAP may contain information indicative of the provisioning of the slots. Thus, once it is received by the various endpoints and relay stations, they are able to determine the appropriate subchannel and time slots with which they are to send or receive data. These steps may be repeated before each frame begins so that the wireless resources are efficiently distributed and utilized even as different endpoints enter into and exit out of the coverage area of a particular base station or relay station.

As discussed above, the steps depicted in FIG. 4 may be repeated on a frame-by-frame basis. In other words, the downlink MAP that is transmitted may be continuously updated so that each time that a downlink MAP is transmitted for a new frame the slots are provisioned within the frame such that all endpoints, single hop access points and multi-hop access points, receive approximately the same data rate.

Some of the steps illustrated in FIG. 4 may be combined, modified or deleted where appropriate, and additional steps may also be added to the flowchart. Additionally, steps may be performed in any suitable order without departing from the scope of particular embodiments. For example, in particular embodiments, slots may first be tentatively assigned to the multi-hop access links and then assigned to the relay link.

Thus far several different embodiments and features have been presented. Particular embodiments may combine one or more of these features depending on operational needs and/or component limitations. This may allow for great adaptability of cell 200 to the needs of various organizations and users. For example, a particular embodiment may use several base stations to provide wireless access for a metropolitan area, or a single base station may be used with several relay stations to provide the necessary coverage and capacity. Furthermore, in some embodiments, relay stations 250 may have more or less radios. Some embodiments may include additional features.

While various implementations and features are discussed with respect to multiple embodiments, it should be understood that such implementations and features may be combined in various embodiments. For example, features and functionality discussed with respect to a particular figure, such as FIG. 2, may be used in connection with features and functionality discussed with respect to another such figure, such as FIG. 1, according to operational needs or desires.

Although particular embodiments have been described in detail, it should be understood that various other changes, substitutions, and alterations may be made hereto without departing from the spirit and scope of the present invention. For example, although an embodiment has been described with reference to a number of elements included within communication system 100 such as endpoints, base stations and relay stations, these elements may be combined, rearranged or positioned in order to accommodate particular routing architectures or needs. In addition, any of these elements may be provided as separate external components to communication system 100 or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for allocating resources in a wireless network, comprising:
    establishing one or more relay links between at least one base station and one or more relay stations;
    establishing one or more single-hop access links between one or more endpoints and the base station;
    establishing one or more multi-hop access links between one or more multi-hop endpoints and the relay stations;
    iteratively repeating the following steps until a first, second and third number of slots are provisioned:
        allocating the first number of slots to the relay links;
        dividing the first number of slots among the relay links;
        determining a representative relay data rate indicative of a data rate provided by one of the relay links for a respective one of the multi-hop access links, the representative relay data rate based on the number of slots divided to the respective relay link and the number of multi-hop access links established with the respective relay station;
        allocating the second number of slots to the multi-hop access links;
        dividing the second number of slots among the multi-hop access links ensuring that each multi-hop access link comprises an approximately equal multi-hop data rate;
        determining the effective multi-hop data rate based on the minimum of the representative relay link data rate and the multi-hop data rate;
        allocating the third number of slots to the single-hop access links;
        dividing the third number of slots among the single-hop access links ensuring that each single-hop access link comprises an approximately equal single-hop data rate;
        determining a minimum data rate based on the minimum of the single-hop data rate and the effective multi-hop data rate; and
        upon determining that the minimum data rate has reached its maximum value, provisioning the first number of slots to the relay links, the second number of slots to the multi-hop access links, and the third number of slots to the single-hop access links.

2. The method of claim 1, wherein at least one of the relay stations comprises a non-transparent relay station.

3. The method of claim 1, further comprising collecting link quality information associated with at least one of at least the single-hop access links, multi-hop access links, or relay links.

4. The method of claim 3:
    wherein dividing the first number of slots among the relay links comprises dividing the first number of slots such that the number of slots divided to one of the relay links is proportional to the number of multi-hop access links established with the respective relay station and inversely proportional to the link-quality associated with the respective relay link;
    wherein the representative relay data rate is further based on the link quality associated with the respective relay link;
    further comprising determining the multi-hop data rate for a multi-hop access link based on the link quality associated with the multi-hop access link; and
    further comprising determining the single-hop data rate for a single-hop access link based on the link quality associated with the single-hop access link.

5. The method of claim 1, wherein:
    allocating the second number of slots to the multi-hop access links comprises:
        determining a total number of slots available in a relay station sub-frame; and
        subtracting the number of slots divided to one of the relay links from the total number of slots available in a sub-frame; and
    allocating the third number of slots to the single-hop access links comprises:
        determining a total number of slots available in a base station sub-frame; and subtracting the first number of slots allocated to the relay link from the total number of slots available in the sub-frame.

6. The method of claim 1, further comprising transmitting a downlink MAP for a frame, the downlink MAP comprising information indicative of the provisioning for the frame of the first number of slots, the second number of slots, and the third number of slots.

7. The method of claim 6, wherein the method of claim 1 is repeated on a frame-by-frame basis before each transmission of a downlink MAP for a frame.

8. The method of claim 1, wherein:
establishing one or more relay links comprises establishing at least one relay link between a first relay station and a second relay station; and
allocating the first number of slots comprises allocating a first portion of the first number of slots to a relay link between the first relay station and the second relay station and a second portion of the first number of slots to a relay link between the base station and one of the first or second relay stations.

9. An apparatus for allocating resources in a wireless network, comprising:
an interface operable to:
establish one or more relay links between at least one base station and one or more relay stations;
establish one or more single-hop access links between one or more endpoints and the base station;
establish one or more multi-hop access links between one or more multi-hop endpoints and the relay stations; and
a processor coupled to the interface wherein, until a first, second and third number of slots are provisioned, the processor is iteratively operable to:
allocate the first number of slots to the relay links;
divide the first number of slots among the relay links;
determine a representative relay data rate indicative of a data rate provided by one of the relay links for a respective one of the multi-hop access links, the representative relay data rate based on the number of slots divided to the respective relay link and the number of multi-hop access links established with the respective relay station;
allocate the second number of slots to the multi-hop access links;
divide the second number of slots among the multi-hop access links ensuring that each multi-hop access link comprises an approximately equal multi-hop data rate;
determine the effective multi-hop data rate based on the minimum of the representative relay link data rate and the multi-hop data rate;
allocate the third number of slots to the single-hop access links;
divide the third number of slots among the single-hop access links ensuring that each single-hop access link comprises an approximately equal single-hop data rate;
determine a minimum data rate based on the minimum of the single-hop data rate and the effective multi-hop data rate; and
upon determining that the minimum data rate has reached its maximum value, provision the first number of slots to the relay links, the second number of slots to the multi-hop access links, and the third number of slots to the single-hop access links.

10. The apparatus of claim 9, wherein the at least one relay station comprises at least one non-transparent relay station.

11. The apparatus of claim 9, wherein the interface is further operable to collect link quality information associated with at least one of at least the single-hop access links, multi-hop access links, or relay links.

12. The apparatus of claim 11, wherein:
the processor operable to divide the first number of slots among the relay links is further operable to divide the first number of slots such that the number of slots divided to one of the relay links is proportional to the number of multi-hop access links established with the respective relay station and inversely proportional to the link-quality associated with the respective relay link;
the representative relay data rate is further based on the link quality associated with the respective relay link;
the processor is further operable to determine the multi-hop data rate for a multi-hop access link based on the link quality associated with the multi-hop access link; and
the processor is further operable to determine the single-hop data rate for a single-hop access link based on the link quality associated with the single-hop access link.

13. The apparatus of claim 9, wherein:
the processor operable to allocate the second number of slots to the multi-hop access links is further operable to:
determine a total number of slots available in a relay station sub-frame; and
subtract the number of slots divided to one of the relay links from the total number of slots available in a sub-frame; and
the processor operable to allocate the third number of slots to the single-hop access links is further operable to:
determine a total number of slots available in a base station sub-frame; and
subtract the first number of slots allocated to the relay link from the total number of slots available in the sub-frame.

14. The apparatus of claim 9, wherein the interface is further operable to transmit a downlink MAP for a frame, the downlink MAP comprising information indicative of the provisioning for the frame of the first number of slots, the second number of slots, and the third number of slots.

15. The apparatus of claim 14, wherein the processor operable to provision the first, second and third number of slots is further operable to provision the first, second and third number of slots on a frame-by-frame basis before the interface transmits each downlink MAP for a frame.

16. The apparatus of claim 9, wherein:
the interface operable to establish one or more relay links comprises an interface operable to establish at least one relay link between a first relay station and a second relay station; and
the processor operable to allocate the first number of slots is further operable to allocate a first portion of the first number of slots to a relay link between the first relay station and the second relay station and a second portion of the first number of slots to a relay link between the base station and one of the first or second relay stations.

17. Logic encoded on non-transitory computer readable media comprising code that, when executed by a processor, is operable to:
establish one or more relay links between at least one base station and one or more relay stations;
establish one or more single-hop access links between one or more endpoints and the base station;

establish one or more multi-hop access links between one or more multi-hop endpoints and the relay stations;

iteratively repeating the following operations until a first, second and third number of slots are provisioned:
allocate the first number of slots to the relay links;
divide the first number of slots among the relay links;
determine a representative relay data rate indicative of a data rate provided by one of the relay links for a respective one of the multi-hop access links, the representative relay data rate based on the number of slots divided to the respective relay link and the number of multi-hop access links established with the respective relay station;
allocate the second number of slots to the multi-hop access links;
divide the second number of slots among the multi-hop access links ensuring that each multi-hop access link comprises an approximately equal multi-hop data rate;
determine the effective multi-hop data rate based on the minimum of the representative relay link data rate and the multi-hop data rate;
allocate the third number of slots to the single-hop access links;
divide the third number of slots among the single-hop access links ensuring that each single-hop access link comprises an approximately equal single-hop data rate;
determine a minimum data rate based on the minimum of the single-hop data rate and the effective multi-hop data rate; and
upon determining that the minimum data rate has reached its maximum value, provision the first number of slots to the relay links, the second number of slots to the multi-hop access links, and the third number of slots to the single-hop access links.

18. The computer readable media of claim 17, wherein the at least one relay station comprises at least one non-transparent relay station.

19. The computer readable media of claim 17, wherein the code is further operable to collect link quality information associated with at least one of at least the single-hop access links, multi-hop access links, or relay links.

20. The computer readable media of claim 17, wherein:
the code operable to divide the first number of slots among the relay links is further operable to divide the first number of slots such that the number of slots divided to one of the relay links is proportional to the number of multi-hop access links established with the respective relay station and inversely proportional to the link-quality associated with the respective relay link;
the representative relay data rate is further based on the link quality associated with the respective relay link;
the code is further operable to determine the multi-hop data rate for a multi-hop access link based on the link quality associated with the multi-hop access link; and
the code is further operable to determine the single-hop data rate for a single-hop access link based on the link quality associated with the single-hop access link.

21. The computer readable media of claim 17, wherein:
the code operable to allocate the second number of slots to the multi-hop access links is further operable to:
determine a total number of slots available in a relay station sub-frame; and
subtract the number of slots divided to one of the relay links from the total number of slots available in a sub-frame; and
the code operable to allocate the third number of slots to the single-hop access links is further operable to:
determine a total number of slots available in a base station sub-frame; and
subtract the first number of slots allocated to the relay link from the total number of slots available in the sub-frame.

22. The computer readable media of claim 17, wherein the code is further operable to transmit a downlink MAP for a frame, the downlink MAP comprising information indicative of the provisioning for the frame of the first number of slots, the second number of slots, and the third number of slots.

23. The computer readable media of claim 22, wherein the code is further operable to repeat the operations of claim 15 on a frame-by-frame basis before each transmission of a downlink MAP for a frame.

24. The computer readable media of claim 17, wherein the code operable to:
establish one or more relay links is further operable to establish at least one relay link between a first relay station and a second relay station; and
allocate the first number of slots is further operable to allocate a first portion of the first number of slots to a relay link between the first relay station and the second relay station and a second portion of the first number of slots to a relay link between the base station and one of the first or second relay stations.

* * * * *